July 9, 1935.  A. C. GILBERT ET AL  2,007,299

BEVERAGE MIXER

Filed Nov. 25, 1932

Inventor
Alfred C. Gilbert
Arthur A. Arnold
By Rockwell & Bartholow
Attorneys

Patented July 9, 1935

2,007,299

UNITED STATES PATENT OFFICE 2,007,299

BEVERAGE MIXER

Alfred C. Gilbert, North Haven, and Arthur A. Arnold, New Haven, Conn., assignors to The A. C. Gilbert Company, New Haven, Conn., a corporation of Maryland Application November 25, 1932, Serial No. 644,294

17 Claims. (Cl. 259—135)

This invention relates to beverage mixers and particularly to electrical motor driven beverage mixers. In such mixers it is particularly desirable that the motor driven mixing element be substantially rigidly retained in operative position within a container while the mixing operation is being performed and that the container and mixing element be readily separated when the operation of mixing is completed.

One of the objects of this invention is to provide an improved beverage mixer of comparatively simple and inexpensive structure and which will be particularly efficient in use.

Another object is to provide an improved beverage mixer wherein the motor and the mixing element are swingable into and out of mixing position and wherein provision is made to releasably and substantially rigidly position and retain the mixing element in operative position to efficiently perform the mixing operation.

Still another object is to provide for a beverage mixer of this type a supporting base of novel form wherein a container may be received and the motor driven element pivoted thereto and releasably retained in operative position in respect to the container.

To these and other ends the invention consists in the novel features and combinations of parts to be hereinafter described and claimed.

Figure 1:
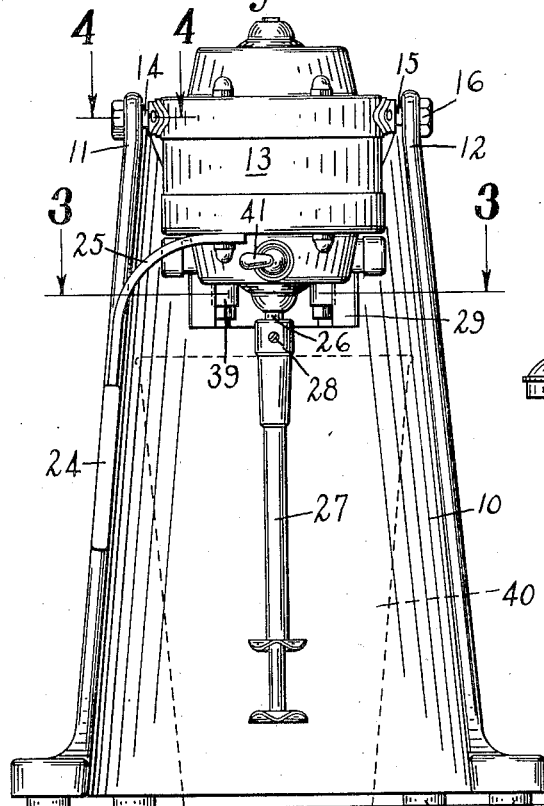
Fig. 1 is a front elevational view of a beverage mixer embodying the features of this invention.

The beverage mixer selected to illustrate the features of my invention is provided with a base 10, which is generally U-shaped in horizontal cross-section, which gradually converges as it extends upwardly and has its side walls still further extended upwardly to form arms 11 and 12 between which an electric motor 13 is disposed and pivotally supported. The motor 13 is pivotally supported upon threaded studs 14 and 15 that are respectively threaded into openings provided in the upper ends of arms 11 and 12, each stud being locked in place therein by a lock nut 16. The studs 14 and 15 are each provided with a cone-shaped end 17, which rides in a correspondingly shaped recess 18, formed in a bracket 19, one of which is secured to diametrically opposite sides of the motor casing 20. The brackets 19 are preferably secured to the motor casing by bolts 21.

It is also considered preferable to place a strip or rubber, or like material 22, between the brackets 19 and the motor casing 20 before securing these parts together to substantially absorb any vibrations set up during the operation of mixing. Foot members 23 of resilient material are also provided and disposed upon the underside of base 10.

The pivot point between the base 10 and the motor 13, formed by the threaded studs 14 and 15, is disposed above the center of gravity in the motor so as to cause the same to normally remain in a vertical position with its axis disposed in a vertical plane. The motor may be swung out of this vertical position by means of a handle 24, which is secured to the motor casing 20 and disposed to one side of the motor axis by being bent as at 25 away from the casing 20 and then directed downwardly. The motor 13 is provided with an armature shaft 26, which extends outwardly beyond the lower end of casing 20 and to the end of which a mixing element 27 is removably secured by a screw 28.

Figure 2:
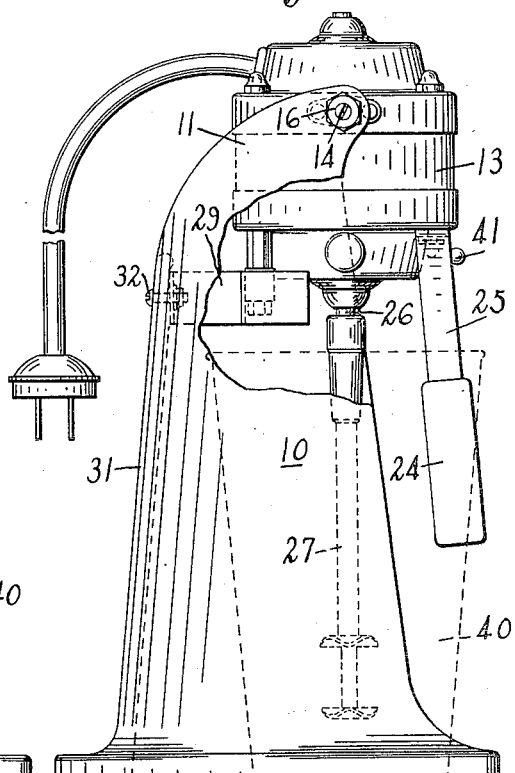
Fig. 2 is a side elevation of the same.

When in operative and normal position, as shown in Figs. 1 and 2, the motor 13 and mixing element 27 are releasably retained against movement by the engagement of a clip 29 with a pair of spaced apart pins 30 depending from the motor casing 20. The clip 29 is generally U-shaped in cross-section and extends horizontally from the upwardly extending rear portion 31 of the base 10, being secured thereto by a bolt 32. Arms 33 and 34 of the clip 29 are each bent intermediate their ends to form pin gripping recesses 35. The recesses 35 are formed by bending the material of each arm outwardly substantially at right angles to each arm as at 36, then bending it inwardly at an acute angle to portion 36 as at 37, and then again outwardly at an obtuse angle to portion 37 as at 38. The end portions 38 are therefore transversely spaced apart an amount sufficient to engage the pair of spaced apart pins 30 and guide them toward the recess 35 into which they will snap due to the resiliency of arms 33 and 34, and retain the motor 13 in operative position, the portions 36 of the clip acting as limiting and positioning stops to prevent the motor swinging too far in a rearward direction. The portions 37 at the same time releasably retain the motor in such position. Preferably, the pins 30 are covered with rubber or like tubing 39 to increase the friction between them and the clip portions 37, as well as to reduce possible noise occasioned when being forced into position or due to possible vibration of the device when in operation.

Figure 3:
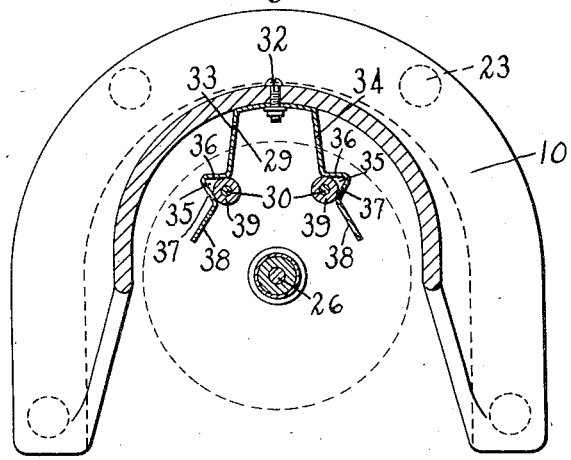
Fig. 3 is a section on line 3—3 of Fig. 1.
Figure 4:
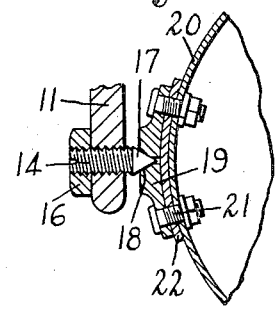
Fig. 4 is a section on line 4—4 of Fig. 1.

When desiring to operate the device of this invention as a beverage mixer, the ingredients to be mixed are deposited in container 40, shown in dotted lines in Figs. 1, 2 and 3. The motor 13 with the mixing element 27 is swung outwardly by manual manipulation of handle 24, and the container 40 is set into position between the arms 11 and 12 of base 10, while gradually permitting the mixing element and motor to swing inwardly with the mixing element in the container. The motor and mixing element are then given a slight inward thrust by handle 24 to snap the pins 30 into clip 29 whereby the motor and mixing element are releasably positioned for operation. A switch 41 is then manipulated to supply electrical energy to motor 13, whereupon the operation of mixing starts and is permitted to continue until completed without further attention by the user.

The switch 41, in this instance, is disposed upon the front of motor casing 20 adjacent the lower end thereof. In this position, the switch 41 is particularly convenient to operate, it being within easy reach of the thumb of the user's hand that is grasping the handle 24, whereby the other hand is free to hold and control the beverage container 40.

The positioning stops 36 prevent the movement of the motor and mixing element rearwardly beyond the proper position in respect to the container 40, and the clip portions 37 releasably retain them in such position. When the mixing operation is completed, motor 13 is stopped by operation of switch 41 and the container 40 is removed while swinging the motor and mixing element outwardly by means of handle 24. After the removal of the container the handle 24 may be released whereupon the motor and mixing element will swing inwardly into its normal vertical position, due to the motor being pivoted above its center of gravity, and be retained therein by the engagement of clip 29 with pins 30.

While we have shown and described a preferred embodiment of our invention, it will be understood that it is not to be limited to the details shown, but is capable of modification and variation within the spirit of the invention and the scope of the appended claims.

What we claim is:

1. In a beverage mixer, an upwardly extending base which is generally U-shaped in cross-section in a horizontal plane throughout substantially its entire length and has arm portions extending upwardly from the upper edge thereof, an electric motor having an agitator shaft secured thereto and rotatable thereby, said motor being pivotally supported by and between said arms at a point above the center of gravity of said motor whereby said agitator shaft is normally disposed with its axis in a vertical plane, a part pivotally movable with said motor, and means to engage said part to positively insure that said agitator shaft will assume its normal position and to automatically releasably retain it therein.

2. In a beverage mixer, a base generally U-shaped in cross-section in a horizontal plane, and having upwardly extending arm portions, an electric motor having an agitator shaft secured thereto and rotatable thereby, said motor being pivotally supported by and between the arms of said base at a point above the center of gravity of said motor whereby said motor is normally disposed with the axis of said agitator shaft in a vertical plane, a U-shaped clip extending laterally from said base, and means on said motor engageable by said clip to retain said motor in its normal position.

3. In a beverage mixer, a base generally U-shaped in cross-section in a horizontal plane, and having upwardly extending arm portions, an electric motor having an agitator shaft secured thereto and rotatable thereby, said motor being pivotally supported by and between the arms of said base at a point above the center of gravity of said motor whereby said motor is normally disposed with the axis of said agitator shaft in a vertical plane, a U-shaped clip extending laterally from said base, and a pair of spaced apart pins on said motor each releasably engageable by an arm of said clip to retain said motor in its normal position.

4. In a beverage mixer, an upwardly extending base which is generally U-shaped in cross-section in a horizontal plane throughout substantially its entire length, an electric motor having an agitator secured to the shaft thereof to be rotated thereby, said motor being pivotally supported adjacent the upper edge of said base to permit said agitator to swing downwardly and normally assume a vertical position between the sides and back of said U-shaped base, the sides of said U-shaped base extending forwardly beyond the vertical axis of said agitator.

5. In a beverage mixer, an upwardly extending base which is generally U-shaped in cross-section in a horizontal plane throughout substantially its entire length, an electric motor having an agitator secured to the shaft thereof to be rotated thereby, said motor being pivotally supported adjacent the upper edge of said base to permit said agitator to swing downwardly and normally assume a vertical position between the sides and back of said U-shaped base, the sides of said U-shaped base extending forwardly beyond the vertical axis of said agitator, and being horizontally spaced apart sufficiently to permit a container to be disposed therebetween with its vertical axis in alignment with the axis of said agitator.

6. In a beverage mixer, a base, a motor support on said base, a motor pivotally mounted on said support and normally assuming a position with the axis of its shaft in a vertical plane, a U-shaped clip extending laterally from said base, and means on said motor engageable by and between the arms of said clip to retain said motor in its normal position.

7. In a beverage mixer, a base, a motor support on said base, a motor pivotally mounted on said support and normally assuming a position with the axis of its shaft in a vertical plane, a U-shaped clip extending laterally from said base, and a pair of spaced apart pins on said motor each releasably engageable by an arm of said clip to retain said motor in its normal position.

8. In a beverage mixer, a base having spaced apart upstanding arms, a motor having a casing, and an agitator shaft secured to said motor and rotatable thereby, said motor being disposed between said arms, a bracket secured at diametrically opposite points to said motor casing and above the center of gravity of said motor, a strip of resilient material disposed between each bracket and the adjacent portion of the motor casing to which it is secured, each of said brackets having a cone-shaped recess therein, and a threaded stud having a cone-shaped end passing through and threadingly cooperating with each of said upstanding arms and engaging the adjacent bracket with its cone-shaped end seated in the cone-shaped recess therein to pivotally support said motor with the axis of said agitator shaft normally disposed in a vertical plane.

9. An upwardly extending base having arm portions extending upwardly from the upper edge thereof, an electric motor having an agitator shaft secured thereto and rotatable thereby, said motor being pivotally supported by and between said arms at a point above the center of gravity of said motor whereby said agitator shaft is normally disposed with its axis in a vertical plane, a part pivotally movable with said motor, and means secured to the base adjacent said arms to embrace said part to automatically and releasably retain said agitator shaft against pivotal movement from its normal position.

10. In a beverage mixer, a support having upwardly extending side portions, an electric motor having an agitator secured to the shaft thereof to be rotated thereby, said motor being pivotally supported on said support between the side portions thereof to permit said agitator to swing downwardly and normally assume a vertical position between the side portions of said support, the side portions of said support extending forwardly beyond the vertical axis of said agitator and being elongated to embrace the agitator.

11. In a beverage mixer, a base having upwardly extending side arms, said side arms being spaced apart to receive a receptacle therebetween, a motor pivotally mounted to and between said side arms, a mixing element extending from, secured to and driven by said motor, a handle to swing said motor, said handle extending outwardly from said motor toward one of said base side arms, and then being extended substantially parallel to the axis of said motor in the direction said mixing element extends to avoid interfering with a receptacle placed between said side arms.

12. In a beverage mixer, a base having upwardly extending side arms, said side arms being spaced apart to receive a receptacle therebetween, a motor pivotally mounted to and between said side arms, a mixing element extending from, secured to and driven by said motor, a handle to swing said motor, said handle extending outwardly from said motor toward one of said base side arms, and then being extended substantially parallel to the axis of said motor in the direction said mixing element extends to avoid interfering with a receptacle placed between said side arms, and cooperating means between said motor and said base to limit the swinging movement of said motor and to releasably retain said motor in one position of its movement.

13. In a beverage mixer, a support having upwardly extending side portions and a back portion, an electric motor having an agitator secured to the shaft thereof to be rotated thereby, said motor being pivotally supported on said support between the side portions thereof and in front of said back portion to permit said agitator to swing downwardly and normally assume a vertical position between the side portions of said support, and means on said back portion adapted to engage a part of the motor to limit the swinging movement of said motor and to releasably retain said motor in one position of its movement.

14. A beverage mixer comprising an upwardly extending base having arm portions at the upper edge thereof, an electric motor having an agitator shaft secured thereto and rotatable thereby, said motor being pivotally supported by and between said arms, a part pivotally movable with said motor, and resilient means secured to the base adjacent said arms and adapted to engage said part to releasably retain the motor and shaft against pivotal movement from normal position.

15. A beverage mixer comprising an upwardly extending base having arm portions at the upper edge thereof, an electric motor having an agitator shaft secured thereto and rotatable thereby, said motor being pivotally supported by and between said arms, a part pivotally movable with said motor, and a spring catch secured to the base and adapted to engage said part to releasably retain the motor and shaft against pivotal movement from normal position.

16. In a beverage mixer, an upwardly extending base having arm portions extending upwardly from the upper edge thereof, an electric motor having an agitator shaft secured thereto and rotatable thereby, said motor being pivotally supported by and between said arms at a point above the center of gravity of the motor whereby said agitator shaft is normally disposed with its axis in a vertical plane, a part secured to the motor, and means on the base below the pivotal support of the motor to automatically engage said part and releasably retain said motor and shaft against pivotal movement from its normal position.

17. In a beverage mixer, an upwardly extending base which is generally U-shaped in cross-section in a horizontal plane throughout its entire length whereby said base presents back and side portions, arm portions extending upwardly from the upper edge of the base, an electric motor pivotally supported by and between said arm portions, said motor having an agitator shaft secured thereto and rotatable thereby, and said pivotal point of support being above the center of gravity of said motor whereby said agitator shaft is normally disposed with its axis in a horizontal plane, a part pivotally movable with said motor, and means on the back portion of the base rearwardly of the motor to engage said part to releasably retain the agitator shaft in its normal position.

ALFRED C. GILBERT.
ARTHUR A. ARNOLD.